United States Patent
Herzog et al.

(10) Patent No.: US 11,014,196 B2
(45) Date of Patent: May 25, 2021

(54) METHOD FOR CALIBRATING AT LEAST ONE SCANNING SYSTEM OF AN SLS OR SLM INSTALLATION

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Fabian Zeulner, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 277 days.

(21) Appl. No.: 16/083,840

(22) PCT Filed: Feb. 2, 2017

(86) PCT No.: PCT/EP2017/052273
§ 371 (c)(1),
(2) Date: Sep. 10, 2018

(87) PCT Pub. No.: WO2017/174226
PCT Pub. Date: Oct. 12, 2017

(65) Prior Publication Data
US 2019/0134747 A1 May 9, 2019

(30) Foreign Application Priority Data

Apr. 7, 2016 (DE) .......................... 102016106403.3

(51) Int. Cl.
*B23K 26/34* (2014.01)
*B29C 64/153* (2017.01)
(Continued)

(52) U.S. Cl.
CPC .............. *B23K 26/34* (2013.01); *B22F 10/00* (2021.01); *B23K 26/354* (2015.10);
(Continued)

(58) Field of Classification Search
CPC .... B23K 26/34; B23K 26/354; B29C 64/153; B29C 64/386; B29C 64/393; B33Y 50/02;
(Continued)

(56) References Cited

U.S. PATENT DOCUMENTS 5,430,666 A * 7/1995 DeAngelis ............. B33Y 10/00
250/491.1
5,832,415 A * 11/1998 Wilkening ............. G02B 26/10
702/86
(Continued)

FOREIGN PATENT DOCUMENTS

DE 4437284 A1 4/1996
DE 102013208651 A1 11/2014
(Continued)

OTHER PUBLICATIONS

Hofmann et al., DE102009036153 (Year: 2009).*
(Continued)

*Primary Examiner* — Mohammad K Islam
(74) *Attorney, Agent, or Firm* — Dority & Manning, P.A.

(57) ABSTRACT

A procedure for calibration of at least one scanning system of a laser sinter or laser melt facility can be carried out in a short time, can take place automatically, and thereby can be carried out before each individual construction process. The procedure may include generation of at least one line pattern through at least one scanning system on a surface at the level of a construction field.

10 Claims, 4 Drawing Sheets

(51) Int. Cl.
    *B33Y 50/02*         (2015.01)
    *B29C 64/386*      (2017.01)
    *G05B 19/401*      (2006.01)
    *B22F 10/00*        (2021.01)
    *B33Y 10/00*        (2015.01)
    *B33Y 50/00*        (2015.01)
    *B23K 26/354*      (2014.01)
    *B22F 10/10*        (2021.01)

(52) U.S. Cl.
    CPC .......... *B29C 64/153* (2017.08); *B29C 64/386* (2017.08); *B33Y 10/00* (2014.12); *B33Y 50/00* (2014.12); *B33Y 50/02* (2014.12); *G05B 19/401* (2013.01); *B22F 10/10* (2021.01); *G05B 2219/37017* (2013.01); *G05B 2219/49018* (2013.01)

(58) Field of Classification Search
    CPC ...... B33Y 10/00; B33Y 50/00; G05B 19/401; G05B 2219/49018; G05B 2219/37017; B22F 3/1055; B22F 2003/1057
    See application file for complete search history.

(56) References Cited

U.S. PATENT DOCUMENTS

| | | | |
|---|---|---|---|
| 6,369,814 B1 | 4/2002 | Dorbie | |
| 8,233,207 B2 * | 7/2012 | Hastings | G02B 27/0031 359/199.3 |
| 8,666,142 B2 * | 3/2014 | Shkolnik | B29C 64/393 382/154 |
| 9,025,136 B2 * | 5/2015 | Chen | G03B 27/42 355/77 |
| 10,569,470 B2 * | 2/2020 | Donovan | B29C 64/112 |
| 2005/0186692 A1 * | 8/2005 | Olsson | G03F 7/70283 438/16 |
| 2010/0125356 A1 | 5/2010 | Shkolnik et al. | |
| 2015/0255105 A1 * | 9/2015 | Chi | B22F 3/1055 369/47.5 |
| 2016/0054115 A1 | 2/2016 | Snis | |
| 2016/0082668 A1 * | 3/2016 | Perret | B29C 64/277 264/406 |
| 2016/0303797 A1 * | 10/2016 | Moran | B29C 64/135 |

FOREIGN PATENT DOCUMENTS

| | | |
|---|---|---|
| EP | 2186625 A2 | 5/2010 |
| JP | H09511854 A | 11/1997 |
| JP | 2005133120 A | 5/2005 |
| WO | 2009018857 A1 | 2/2009 |

OTHER PUBLICATIONS

International Search Report Corresponding to Application No. PCT/EP2017/052273 dated May 24, 2017.
Machine Translated Japanese Office Action Corresponding to Application No. 2018524556 dated Jan. 25, 2019.

\* cited by examiner

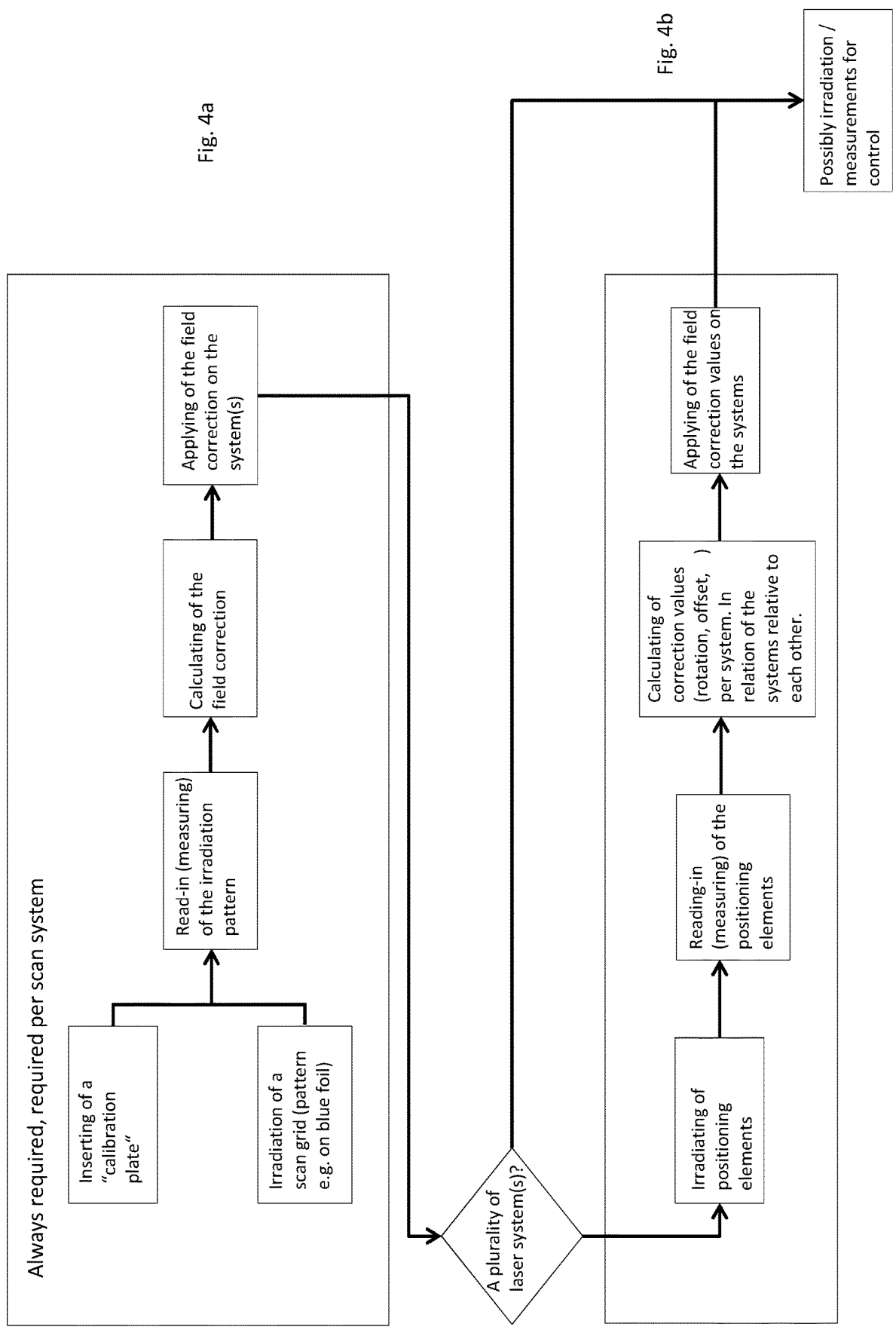

METHOD FOR CALIBRATING AT LEAST ONE SCANNING SYSTEM OF AN SLS OR SLM INSTALLATION

CROSS-REFERENCE TO RELATED APPLICATIONS

This application is a United States national stage entry of an International Application serial no. PCT/EP2017/052273 filed Feb. 2, 2017 which claims priority to German Patent Application serial no. 10 2016 106 403.3 filed Apr. 7, 2016. The contents of these applications are incorporated herein by reference in their entirety as if set forth verbatim.

The invention concerns a method for calibration of at least one scanning system of a laser sintering or laser melt facility with the further characteristics of the preamble of Claim 1.

BACKGROUND

Laser sinter or laser melt systems are provided to manufacture three-dimensional objects by means of a rapid manufacturing process especially through solidification of powdered construction material. In the process, the beam of a light source, usually a laser, is directed by a scanning system onto a construction surface on which there is a thin layer of the construction material. The focused laser beam is suitable for melting and fusing the construction material. The construction material solidifies after the formed melt pool or melt site cools in this location and forms the three-dimensional object by successive adhesion and selective solidification of further layers.

It is of highest importance for the precision and reproducibility of the construction process that the scanning system(s) of a such laser sinter or laser melt facility exactly reproduce what is stored in a construction program that guides the construction process, in other words the alignment of the laser beam in the area of the construction field level does not deviate from a stored specified line that is mapped by the scanning system(s).

It is recognized as the state of the art that the scanner must be exactly aligned manually and this manual alignment then technically checked by software. This is time-consuming, so such an adjustment of the scanning systems is usually done at most only once or twice annually. Besides the high expenditure of time for a manual adjustment, it is also subject to error.

BRIEF SUMMARY

The object of the invention is to form a procedure for calibration of at least one scanning system of a laser sinter or laser melt facility so that the procedure can be carried out in a short time, can take place automatically, and thereby can be carried out before each individual construction process. The object is fulfilled through the characteristic features of claim 1. Advantageous further development, especially also in regard to several scanning systems, can be seen from the dependent claims. In detail, the process provides the following steps for carrying out calibration.

A line pattern, particularly a line grid in the form of a scanning grid, is first produced through at least one scanning system on a surface at the level of the construction field. There are two alternatives here: The first alternative is to project onto a surface unit indicating the line pattern, whereby the display on the surface unit is either temporarily or constantly visible. A temporary display like a constant display of the line pattern can also be recorded by a calibrated cell configured over the construction field and read into a memory.

It is alternately in the scope of the invention to project the line pattern produced by the scanner onto the surface of a calibration plate that already has a specified line pattern on its surface. The deviation of the line pattern produced from the specified line pattern by at least one scanning system can be captured by a camera configured over the construction field and also be read into a memory. The stored data are analyzed according to the first alternative or the deviating data according to the second alternative. A field correction of the line pattern is made by calculation of the correction data that contain the required information for correction of any distortion of the line pattern, especially of the scan grid. In particular, especially pillow-shaped, barrel-shaped, rhomboid, or square-shaped distortions of a, for example, quadratic or other target sample are affected. Correction is in every respective conceivable.

Up to now, the depicted process was based on the calibration of only one scanner, whereby naturally two scanners respectively for themselves and in a given case independently of each other can be corrected in the way described. It is possible now in further development of the procedure after correction of any distortions of the line pattern by means of a number of scanning systems to undertake illumination over one and the same construction field and thereby produce position line patterns and then an adjustment of these position line patterns, especially position grids of the given number of scanning systems to each other, which, as regards any distortions, are already corrected internally in the scanning systems. A calculation is then made of further correction data regarding possible required rotation, offset, scaling, and/or displacement of the systems with each other. By use of further correction data on several scanning systems a mutual alignment and accommodation of several scanning systems is achieved. In this way, for example, the line patterns of several scanning systems can be brought exactly into overlap position or lying exactly beside each other.

If the calculation of the further correction data is separate for every scanning system, then every scanning system can individually be accessed by means of correction data so that adjacent scanning systems or a boundary of the construction field can be precisely aligned. It is, however, also possible to consolidate the correction data ascertained for each scanning system into a total correction data set. Use of this total correction data set for all scanning systems consequently leads to an exact alignment of the various scanning systems with each other. Calculation of further correction data can also be carried out separately related to the outer boundaries of the construction field, so that, for example, the edges of the position line patterns are made parallel with the edges of the construction field.

As already noted, the position line patterns can partially overlap the scanning systems configured next to each other. Mutual correction and alignment can be carried out in that, for example, the edge lines of position line patterns produced by different scanning systems can be positioned congruently over each other or at least partially congruently.

It is also basically in the scope of the invention to indicate deviation data of position line patterns next to or intersecting each other in areas as regards mutual rotation, mutual offsets, and similar parameters numerically on a display of laser sinter or laser melt equipment. "Angular deviation 3°" can, for example, be indicated. A display of this kind gives the user of the facility information that a correction is not yet finished and a manual or partly automated correction is required in order actually to be able to coordinate side-by-side scanning systems so that they produce the same image on the construction field.

The surface unit that is illuminated with a laser beam can be layered. The coating can be configured so that a constantly visible image is burned into the coating by the laser beam.

It is also possible in further development of the invention to integrate the calibration procedure as a subprogram in a construction program for a three-dimensional object and let this subprogram run from the beginning of a construction job so that at the beginning of the actual construction job it is automatically assured that the scanners of the facility carrying out the construction job are coordinated with each other.

BRIEF DESCRIPTION OF THE DRAWINGS

The invention is explained in more detail in the exemplary embodiments in the drawings. The following are shown:

FIG. 4 a simplified schematic flow diagram of the procedures running with the calibration.

DETAILED DESCRIPTION

Figure 1:
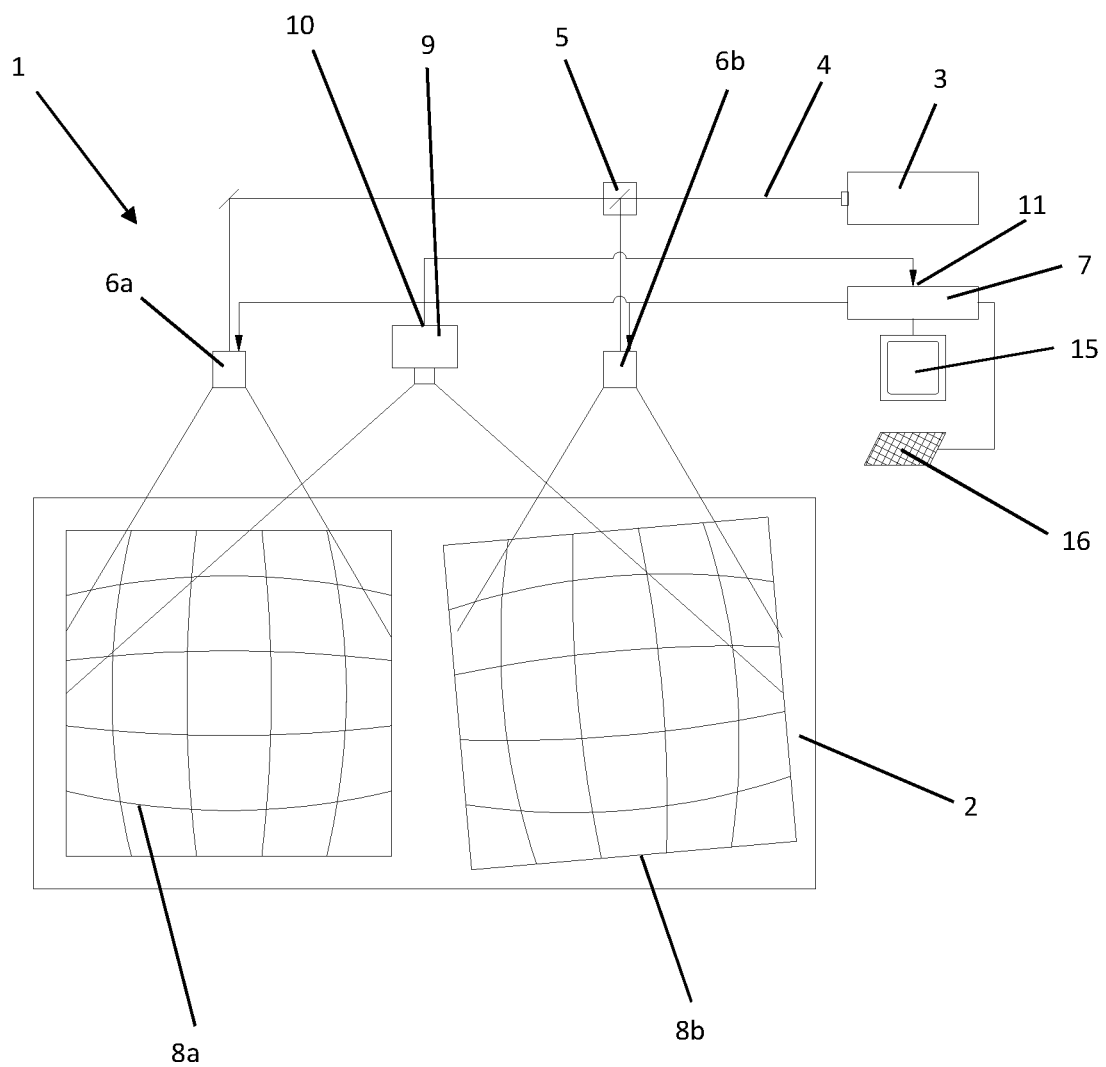
FIG. 1 a greatly simplified schematic depiction of a construction field of a laser sinter or laser melt facility with scanners mounted above it along with a calibrated camera for carrying out calibration of a scanner from line patterns produced by a scanner.

Reference will first be made to drawing FIGS. 1-3. For reasons of simplification, in only the elements of a laser sinter or laser melt facility essential for the invention that can be scanned are depicted in drawing FIG. 1, namely a construction field 2 that can be scanned by radiation from a laser 3 is shown in drawing FIG. 1. Beam 4 of the laser is, in addition, fed via a beam splitter 5 to two scanners 6*a* and 6*b* that direct the beam source of the laser onto the construction field 2 via a mirror controlled by a processor and memory 7 and produce the scanning grids 8*a* and 8*b* with a pillow-shaped distortion shown in FIG. 1. These scanning grids are scanned by a calibrated camera 9. The output 10 of the camera 9 is connected with an input 11 of processor 7, whereby the recorded line patterns 8*a* and 8*b* can be read into the memory of processor 7. Field correction is calculated in processor 7 implemented by calculation of correction data for each scanning system 6*a* and 6*b*, whereby the correction data contain information for the correction of any distortions of the line pattern 8*a*/8*b*. These correction data are associated with appurtenant target data in processor 7, so that correction of the line patterns 8*a*, 8*b* results as depicted in FIG. 2. As a result, the pillow-shaped distortions are rectified in both line patterns 8*a* and 8*b* produced by the scanners 6*a* and 6*b*. The path of the laser focus produced by the mirrors of the scanners exactly follows the parameters of the stored pattern that in the exemplary case is a chess-board pattern. Admittedly, it is still evident in FIG. 2 that the line pattern 8*b* of the scanner 6*b* is tilted by some degrees to the line pattern 8*a* of the scanner 6*a*. In the case that there are several scanners configured over one and the same construction field, a mutual alignment of the line patterns is necessary. These line patterns, in the following designated as position line patterns 8*c*, 8*d*, are read in by the camera, whereby already read-in data on line patterns can be referred to, which already have been entered into memory 7, in order to correct the pillow-shaped distortions in the first step of correction. From this now available data, further correction data are [missing infinitive] regarding mutual rotation, offset, scaling and/or displacement of the systems to each other in that by use of further correction data on several scanning systems a mutual alignment and accommodation of several scanning systems to each other is achieved. This is done exclusively by software according to the invention, whereby basic mechanical orientation of the scanners to each other is extremely useful and can, for example, be carried out in initial startup of a device. The result of this use of further correction data is evident in FIG. 3. Now the line patterns or position line patterns 8*c*, 8*d* are exactly aligned next to each other and can also be configured to be overlapping, i.e. the scanner 6*b* can also exactly track construction field areas that are configured in the position line pattern area 8*a*.

It is basically conceivable to display the correction data or measured distortions, angles, and similar on a display 15 of the device 1 and in a given case to intervene in the correction procedure by means of an input device in the form of a keyboard 16.

The flow diagram according to FIG. 4 is divided into two section FIGS. 4*a* and 4*b*. According to section FIG. 4*a* either a line grid can be radiated or a calibration plate can be inserted. The read-in or measuring of the radiation pattern and a calculation of the field correction is then carried out, whereby the field correction data are used for the system(s) for remediation of, for example, pillow-shaped distortions, as can be seen in the transition from FIG. 1 to FIG. 2.

Figure 2:
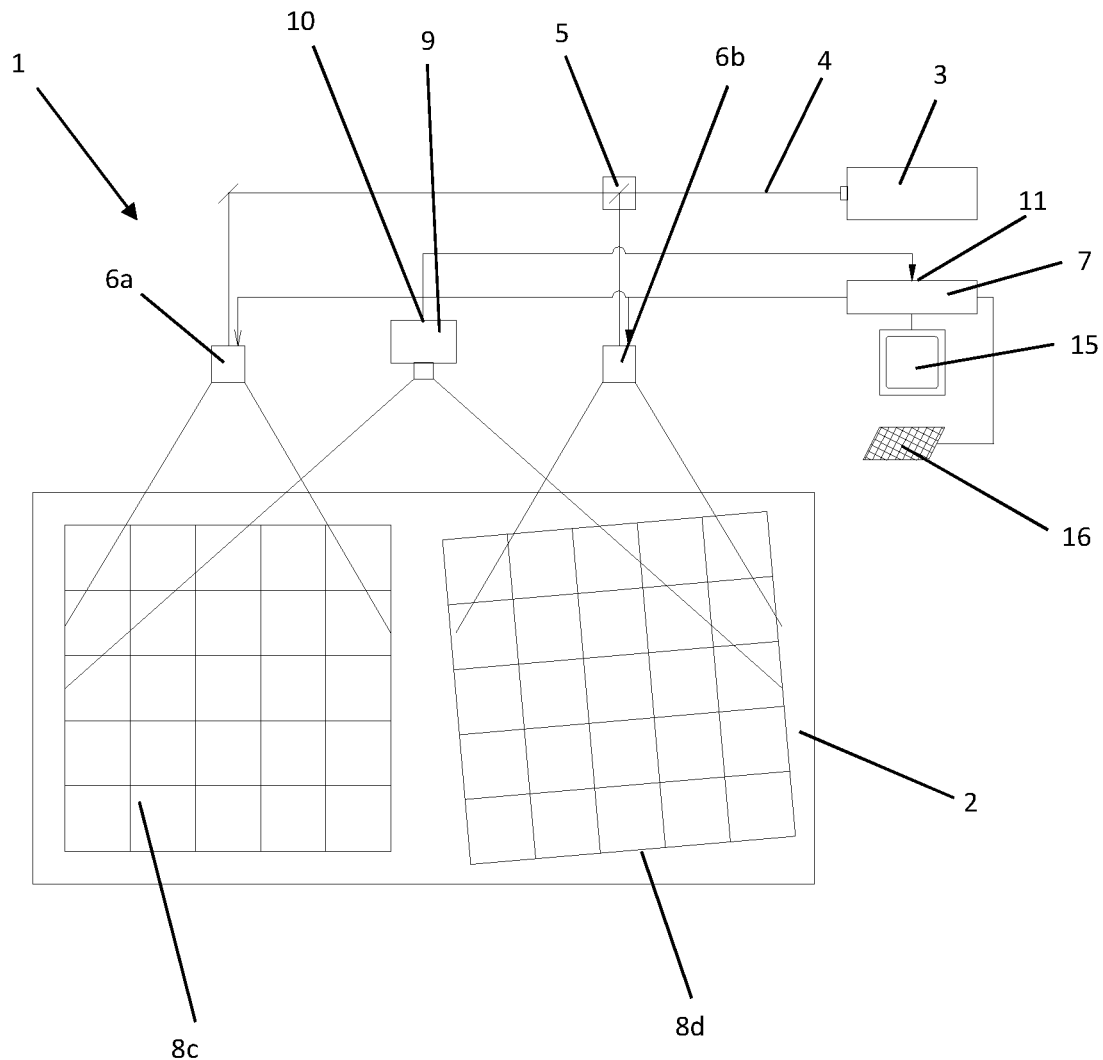
FIG. 2 a depiction according to FIG. 1, in which a pillow-shaped distortion according to FIG. 1 has already been corrected for each individual scanner.
Figure 3:
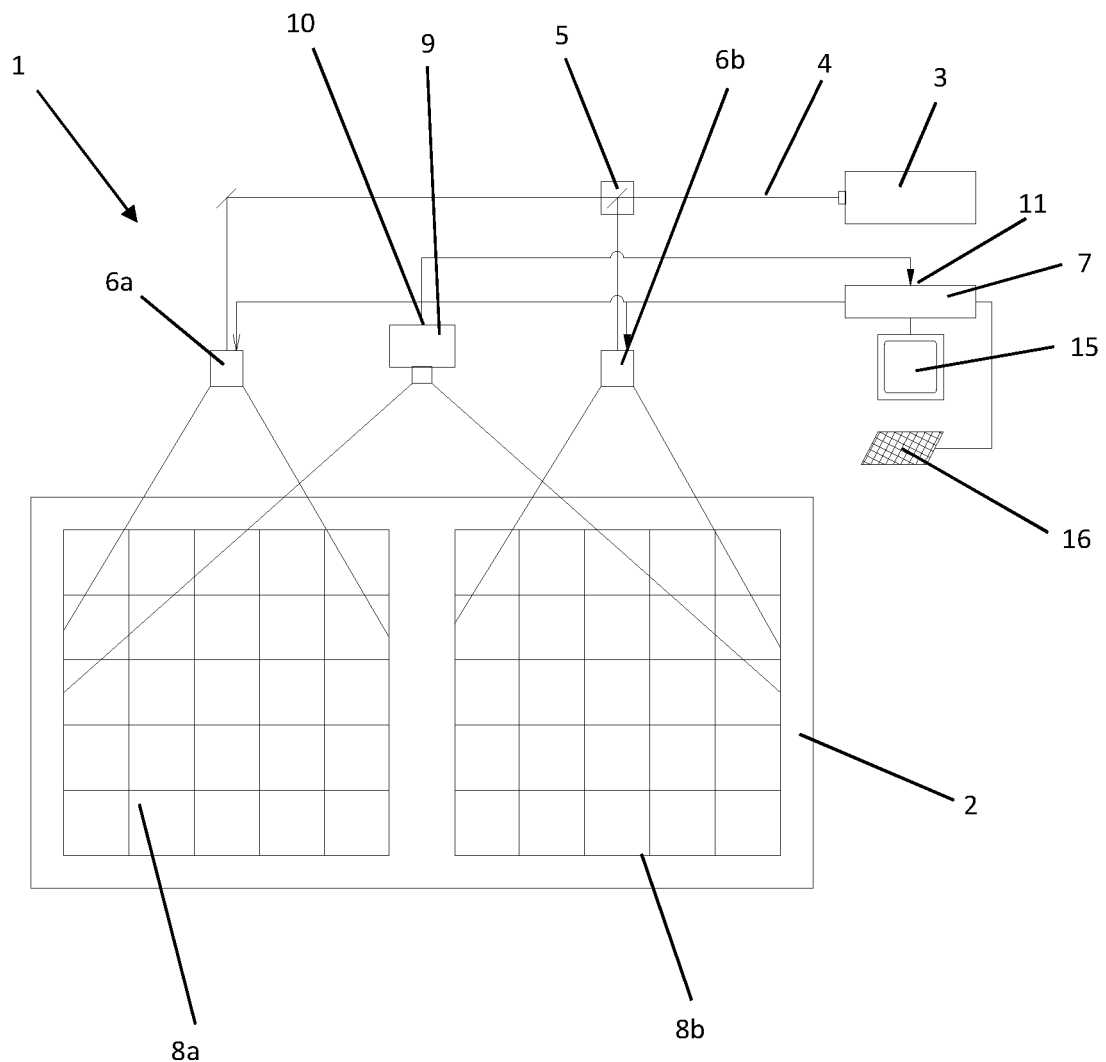
FIG. 3 a depiction according to FIGS. 1 and 2, in which mutual alignment and calibration of the scanners is undertaken for parallel alignment of the position line patterns.

If several laser systems are provided, as in the schematic depiction according to FIGS. 1-3, the line patterns, now termed position line patterns, are exposed and measured through the camera 9 and then correction data regarding rotation calculates an offset-pro-system in reference to the systems. The use of these further correction values on the systems leads to a mutually exact alignment of the line patterns with each other, as can be seen in the transition from FIG. 2 to FIG. 3.

REFERENCE NUMBER LIST

1 Laser sinter or laser melt facility/operation
2 Construction field
3 Laser
4 Beam
5 Beam splitter
6*a/b* Scanning grid, scanning system
7 Processor and memory
8*a/b* Scanning grid
8*c/d* Position line pattern
9 Calibrated camera
10 Exit
11 Entrance
15 Display
16 Keyboard

The invention claimed is:

1. A method of calibrating at least one scanning system of a laser sinter or laser melt facility, the at least one scanning system comprising at least one laser beam source directed onto a construction field in order by a construction process to melt or fuse a construction material capable of sintering or melting and thus through its cooling selectively to solidify such construction material, the method comprising:

generating through the at least one scanning system, at least one line pattern on a surface at the level of the construction field, wherein generating the at least one line pattern comprises:

projecting, by the at least one scanning system, the at least one line pattern on an upper surface of a calibration plate provided with a specified line pattern permanently applied thereto;

recording with a camera disposed over a construction field and reading into a memory, a deviation of the at least one line pattern produced by at least one scanning system from the specified line pattern;

executing, by a processor, a field correction of the at least one line pattern by calculation of correction data regarding the at least one scanning system, the correction data containing information for correction of any distortions of the at least one line pattern; and measuring and correcting, by the processor, the deviation of the at least one line pattern visible on the surface of the calibration plate and recordable with the camera over the construction field so that the at least line pattern produced by the scanning system coincides with the specified line pattern permanently applied to the calibration plate.

2. The method according to claim 1, comprising:

illuminating the construction field with the camera, the camera having been calibrated by the field correction of the at least one line pattern for correction of the distortion of the at least one line pattern; and recording with the camera and reading into the memory, line patterns, which are already corrected as regards distortions;

calculating, by the processor, further correction data regarding rotation, offset, scaling, and/or displacement regarding a plurality of scanning system relative to each other in such a way that by use of further correction data on the plurality of scanning systems and mutual alignment and accommodation of the plurality of scanning systems and the line patterns produced by them is achieved.

3. The method according to claim 1, comprising calculating, by the processor, further correction data for a plurality of scanning systems.

4. The method according to claim 3, wherein calculation data determined, by the processor, for a plurality of scanning systems is aggregated into a combined correction data set.

5. The method according to claim 2, comprising calculating, by the processor, further correction data for the outer limits of the construction field.

6. The method according to claim 2, wherein the line patterns corresponding to adjacent scanning systems intersect one another.

7. The method according to claim 2, wherein line patterns of adjacent scanning systems are configured separately next to each other.

8. The method according to claim 2, comprising showing on a display a deviation from adjacent line patterns or line patterns that overlap in areas due to mutual rotation, mutual offset, mutual scaling, or numerical displacement.

9. The method according to claim 1, wherein the surface unit is illuminated so that a laser beam of a scanning system produces a constantly visible line pattern detectable by the camera.

10. The method according to claim 1, wherein with provision of the at least one scanning system the ascertained correction values concerning rotation, scaling, and displacement relate to the position of the line pattern in the construction chamber or related to at least one edge of the construction chamber.

* * * * *